3,028,383
Patented Apr. 3, 1962

3,028,383
9α-HALO-11β-OXYGENATED 1,2-DEHYDROPRO-
GESTERONES AND DERIVATIVES THEREOF
Josef Fried, New Brunswick, N.J., assignor to Olin
Mathieson Chemical Corporation, New York, N.Y., a
corporation of Virginia
No Drawing. Filed Apr. 6, 1956, Ser. No. 576,544
11 Claims. (Cl. 260—239.55)

This application is a continuation-in-part of my parent applications, Serial No. 489,769, filed February 21, 1955; Serial No. 417,489, filed March 10, 1954, now Patent 2,852,511; and Serial No. 343,243, filed March 18, 1953, now abandoned.

This invention relates to the synthesis of valuable steroids; and has for its objects the provision of (I) an advantageous process of preparing 9α-halo-11β-hydroxy-1,2-dehydroprogesterones and 9α-halo-11-keto-1,2-dehydroprogesterones, and (II) certain compounds useful either themselves as physiologically active steroids or as intermediates in the preparation of physiologically active steroid derivatives.

The process of this invention essentially comprises: (a) dehydrating 11α-hydroxy-1,2-dehydroprogesterone, via an 11α-sulfonyloxy derivative (e.g. 11α-mesyloxy or tosyloxy), prepared by treatment of the 11α-hydroxy compound with a sulfonyl halide (e.g. mesyl chloride or tosyl chloride), to form the corresponding $\Delta^{1,4,9(11)}$-pregnatriene, (b) hydroxybrominating the triene to form the corresponding 9α-bromo-11β-hydroxy-1,2-dehydroprogesterone derivative, (c) converting this 9α-bromo-11β-hydroxy steroid to the corresponding 9β,11β-epoxy derivative, (d) hydrohalogenating the 9β,11β-epoxy derivative to prepare the corresponding 9α-halo-11β-hydroxy-1,2-dehydroprogesterone derivative, and, optionally, (e) oxidizing the 9α-halo-11β-hydroxy steroid, thus formed, to produce the corresponding 9α-halo-11-keto-1,2-dehydroprogesterone derivative.

The compounds of this invention comprise: (A) $\Delta^{1,4,9(11)}$-pregnatriene-3,20-dione; (B) 9β,11β-epoxy-$\Delta^{1,4}$-pregnadiene-3,20-dione; (C) 9α-halo-11β-hydroxy-1,2-dehydroprogesterone; and (D) 9α-halo-11-keto-1,2-dehydroprogesterone.

The compound utilizable as the starting material in the process of this invention is 11α-hydroxy-1,2-dehydroprogesterone, preparable by the process disclosed in the application of Fried and Thoma, Serial No. 576,543, filed on even date herewith, now Patent No. 2,880,217. This compound is reacted with an organic sulfonyl halide (sulfonyl chlorides are preferred but other halides such as bromides and iodides may be used). Although any organic sulfonyl halide may be employed, and thus the aryl sulfonyl chlorides and alkanesulfonyl chlorides are utilizable, the alkanesulfonyl chlorides are preferred, a lower alkanesulfonyl chloride, such as methanesulfonyl chloride (mesyl chloride) being particularly preferred. The reaction is preferably conducted in an anhydrous organic solvent, optimally in a liquid tertiary organic base such as pyridine by interacting the steroid and sulfonyl halide (preferably in the cold). The reaction results in the production of an 11α-sulfonyl-oxy derivative, which is then treated with a salt of a strong base and weak acid (e.g. sodium acetate), preferably in an acidic medium (e.g. glacial acetic acid), optimally at an elevated temperature. The reaction results in the production of $\Delta^{1,4,9(11)}$-pregnatriene-3,20-dione.

In accordance with the next step in the process of this invention, the triene is reacted with a brominating agent in the presence of water. The preferred brominating agents are N-bromamides or N-bromimides of carboxylic acids. Suitable brominating agents include the N-bromamides of lower alkanoic acids (e.g. N-bromacetamide), the N-bromimides of lower alkanedioic acids (e.g. N-bromsuccinimide), and dibromodimethylhydantoin. The reaction is preferably conducted in an aqueous inert organic solvent, such as an alcohol, ketone, or ether. To increase the yield of desired 9α-bromo product, a strong acid, such as perchloric acid, is preferably included in the reaction mixture.

The reaction results in the production of 9α-bromo-11β-hydroxy-1,2-dehydroprogesterone. This compound can then either be oxidized by treatment with an oxidizing agent such as a hexavalent chromium compound (e.g. chromic acid) to the corresponding 9α-bromo-11-keto-1,2-dehydroprogesterone; or converted to the corresponding 9β,11β-epoxy derivative by treatment with a basic reagent such as an alkali metal salt of a lower fatty acid in a lower alcohol (e.g. an alkali metal acetate in ethyl alcohol), or with an alkali metal carbonate, bicarbonate, or hydroxide.

The 9β,11β-epoxy-$\Delta^{1,4}$-pregnadiene-3,20-dione can then be converted to the corresponding 9α-halo-11β-hydroxy derivatives by treatment with the desired hydrogen halide (i.e. hydroiodic acid, hydrobromic acid, and preferably hydrochloric acid and hydrofluoric acid). These 9α-halo-11β-hydroxy derivatives can then be converted to the corresponding 9α-halo-11-keto-1,2-dehydroprogesterone by treatment with an oxidizing agent such as a hexavalent chromium compound (e.g. chromic acid).

The physiologically active final products formed in the last steps of the process of this invention are comprehended by the general formula

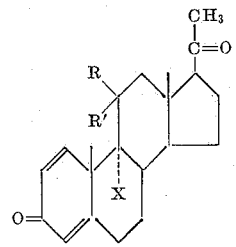

wherein individually R is hydrogen, R' is hydroxy, and together R and R' is keto and X is α-halogen.

The 9α-halo-11β-hydroxy-1,2-dehydroprogesterone and 9α-halo-11-keto-1,2-dehydroprogesterone steroids of this invention are physiologically active compounds which possess glucocorticoid as well as mineralocorticoid activity. Thus, the new steroids of this invention can be administered instead of, and in the same manner as, cortisone or hydrocortisone in the treatment of rheumatoid arthritis and dermatomyositis, or in the same manner as desoxycorticosterone in the treatment of Addison's disease or adrenal insufficiencies. The dosage for such administration is, of course, dependent on the relative activity of the compound; thus, where the steroid derivative has five times the activity of cortisone, the dosage of the former to be employed should be one-fifth of the employed dosage of the latter.

The following examples are illustrative of the invention (all temperatures being in centigrade):

EXAMPLE 1

*1-Dehydro-11α-Hydroxyprogesterone 11α-Mesylate*

To a solution of 300 mg. of 1-dehydro-11α-hydroxyprogesterone in 3 ml. of dry pyridine is added at 0° 0.18 ml. of methanesulfonyl chloride. The mixture is allowed to remain at 0° for 18 hours, poured into water and extracted with chloroform. The chloroform extract is washed with water, dilute sulfuric acid, dilute sodium bicarbonate and water, dried over sodium sulfate and evaporated to dryness in vacuo. The residue is recrystallized from 95% alcohol and furnishes the pure mesylate of the following properties: M.P. 166–168° (dec.); $[\alpha]^{23}D$—109° (c. 0.90 in $CHCl_3$);

$\lambda_{max.}^{alc.}$ 242 m$\mu$ ($\epsilon$=20,300); $\lambda_{max.}^{Nujol}$ 5.90$\mu$, 6.04$\mu$, 6.17$\mu$, 6.26$\mu$

*Analysis.*—Calcd. for $C_{22}H_{30}O_5S$ (404.46): C, 65.01; H, 7.44; S, 7.88. Found: C, 65.08; H, 7.51; S, 7.34.

If for the methanesulfonyl chloride there is substituted toluene-sulfonyl chloride, the corresponding 11α-tosylate is obtained.

EXAMPLE 2

*$\Delta^{1,4,9(11)}$-Pregnatriene-3,20-Dione*

A solution of 377 mg. of 1-dehydro-11α-hydroxyprogesterone mesylate and 753 mg. of anhydrous sodium acetate in 8 ml. of glacial acetic acid is refluxed for 30 minutes. The mixture is poured into water and chloroform and the chloroform extract washed with water, sodium bicarbonate and water, dried over sodium sulfate and evaporated to dryness in vacuo. The residue is recrystallized from acetone-hexane and furnishes pure $\Delta^{1,4,9(11)}$-pregnatriene-3,20-dione of the following properties: M.P. 125–127°; $[\alpha]^{23}D$—78° (c. 0.53 in $CHCl_3$);

$\lambda_{max.}^{alc.}$ 239 m$\mu$ ($\epsilon$=15,700); $\lambda_{max.}^{Nujol}$ 5.89$\mu$, 6.01$\mu$, 6.15$\mu$, 6.23$\mu$

*Anaylsis.*—Calcd. for $C_{21}H_{26}O_2$ (310.42): C, 81.25; H, 8.44. Found: C, 81.36; H, 8.06.

EXAMPLE 3

*9α-Bromo-$\Delta^{1,4}$-Pregnadiene-11β-ol-3,20-Dione*

To a solution of 195 mg. of $\Delta^{1,4,9(11)}$-pregnatriene-3,20-dione in 10 ml. of dioxane is added 1.6 ml. of ⅓ N perchloric acid and 120 mg. of N-bromoacetamide. After 40 minutes at room temperature excess N-bromoacetamide is destroyed with sodium sulfite and chloroform is added. The chloroform extract is washed with water, dilute sodium bicarbonate and again with water, dried over sodium sulfate and the solvents removed in vacuo at low temperature. The residue after recrystallization from acetone-hexane furnishes pure 9α-bromo-$\Delta^{1,4}$-pregnadiene-11β-ol-3,20-dione of the following properties: M.P. 159–160° (dec.); $[\alpha]^{23}D$—150° (c. 1.08 in $CHCl_3$);

$\lambda_{max.}^{alc.}$ 2.41 m$\mu$ ($\epsilon$=17,000);

$\lambda_{max.}^{Nujol}$ 2.97$\mu$, 5.95$\mu$, 6.01$\mu$, 6.14$\mu$, 6.22$\mu$

*Analysis.*—Calcd. for $C_{21}H_{27}O_3Br$ (407.33): C, 61.92; H, 6.68. Found: C, 62.02; H, 6.82.

9α - bromo-$\Delta^{1,4}$-pregnadiene-11β-ol-3,20-dione possesses antirheumatic activity equal to that of cortisone acetate.

EXAMPLE 4

*9α-Bromo-$\Delta^{1,4}$-Pregnadiene-3,11,20-Trione*

To a solution of 29 mg. of 9α-bromo-$\Delta^{1,4}$-pregnadiene-11β-ol-3,20-dione in 3 ml. of reagent grade acetone is added dropwise with stirring 0.05 ml. of a solution of 200 mg. of $CrO_3$ and 320 mg. of $H_2SO_4$ in 1 ml. of water. After 30 minutes at room temperature a few drops of alcohol are added and after 10 minutes the mixture is diluted with water. The resulting suspension is extracted with chloroform and the chloroform extract washed with water, dilute sulfuric acid and again with water, dried over sodium sulfate and evaporated to dryness in vacuo. The residue is recrystallized from acetonehexane and yields pure 9α-bromo-$\Delta^{1,4}$-pregnadiene-3,11,20-trione of the following properties: M.P. 158–159° (dec.); $[\alpha]^{23}D$—275° (c. 0.46 in $CHCl_3$);

$\lambda_{max.}^{alc.}$ 238 m$\mu$ ($\epsilon$=19,200); $\lambda_{max.}^{Nujol}$ 5.87$\mu$, 6.01$\mu$, 6.16$\mu$, 6.23$\mu$

*Analysis.*—Calcd. for $C_{21}H_{25}O_3Br$ (405.32): C, 62.23; H, 6.21. Found: C, 62.33; H, 6.41.

EXAMPLE 5

*$\Delta^{1,4}$-Pregnadiene-9β,11β-Oxido-3,20-Dione*

A solution of 77 mg. of 9α-bromo-$\Delta^{1,4}$-pregnadiene-11β-ol-3,20-dione and 300 mg. of potassium acetate in 3 ml. of absolute alcohol is refluxed for one hour. The mixture is diluted with water, the alcohol removed in vacuo and the residual suspension extracted with chloroform. The chloroform extract is washed with dilute bicarbonate solution and with water, dried over sodium sulfate and evaporated to dryness in vacuo. The residual oil can not be induced to crystallization and is used in the next step without further purification.

EXAMPLE 6

*9α-Chloro-$\Delta^{1,4}$-Pregnadiene-11β-ol-3,20-Dione*

To a solution of 42 mg. of $\Delta^{1,4}$-pregnadiene-9β,11β-oxido-3,20-dione in 8.4 ml. of chloroform is added at 0° 1.85 ml. of a 0.47 N solution of hydrochloric acid in chloroform. After 2.5 hours at 0°, water is added and the chloroform phase is extracted with dilute sodium bicarbonate and with water, dried over sodium sulfate and evaporated to dryness in vacuo. The residue after crystallization from acetone-hexane furnishes pure 9α-chloro-$\Delta^{1,4}$-pregnadiene-11β-ol-3,20-dione having the following properties: M.P. 225–226° (dec.); $[\alpha]^{23}D$—165° (c. 0.66 in $CHCl_3$);

$\lambda_{max.}^{alc.}$ 239 m$\mu$ ($\epsilon$=17,500); $\lambda_{max.}^{Nujol}$ 3.00$\mu$ 5.86$\mu$, 6.02$\mu$, 6.19$\mu$

*Analysis.*—Calcd. for $C_{21}H_{27}O_3Cl$ (362.87): C, 69.52; H, 7.50. Found: C, 69.20; H, 7.35.

9α-chloro-$\Delta^{1,4}$-pregnadiene-11β-ol-3,20-dione possesses about 2–3 times the antirheumatic activity of cortisone acetate.

EXAMPLE 7

*9α-Fluoro-$\Delta^{1,4}$-Pregnadiene-11β-ol-3,20-Dione*

A solution of 66 mg. of $\Delta^{1,4}$-pregnadiene-9β-oxido-3,20-dione in 9.5 ml. of chloroform and 0.5 ml. of alcohol is treated at 0° with anhydrous hydrogen fluoride until the solution assumes a deep red color. The mixture is kept at 0° with stirring and then neutralized by addition of a suspension of sodium bicarbonate in water. After separation of the chloroform layer, the latter is washed with water, dried over sodium sulfate and the solvent removed in vacuo. The residue crystallizes readily and furnishes pure 9α-fluoro-$\Delta^{1,4}$-pregnadiene-11β-ol-3,20-dione upon recrystallization from 95% alcohol. Its properties are as follows: M.P. 251–252°; $[\alpha]^{24}D$—134° (c. 0.84 in $CHCl_3$);

$\lambda_{max.}^{alc.}$ 238 m$\mu$ ($\epsilon$=15,100);

$\lambda_{max.}^{Nujol}$ 2.97$\mu$, 5.86$\mu$, 6.03$\mu$, 6.18$\mu$, 6.24$\mu$

*Analysis.*—Calcd. for $C_{21}H_{27}O_3F$ (346.42): C, 72.81; H, 7.85. Found: C, 72.72; H, 7.87.

9α-fluoro-$\Delta^{1,4}$-pregnadiene-11β-ol-3,20-dione possesses about 5 times the activity of cortisone acetate in the rat liver glycogen test, and about 5 times the activity of desoxycorticosterone acetate in the sodium retention test in the rat.

In a similar manner, by substituting hydrogen iodide in chloroform at −20° for the hydrochloric acid in Example 6, there is obtained 9α-iodo-Δ¹,⁴-pregnadiene-11β-ol-3,20-dione.

EXAMPLE 8

9α-Chloro-Δ¹,⁴-Pregnadiene-3,11,20-Trione

To a solution of 31 mg. of 9α-chloro-Δ¹,⁴-pregnadiene-11β-ol-3,20-dione in 3 ml. of glacial acetic acid is added a solution of 11.6 mg. of chromium trioxide in 3 ml. of glacial acetic acid. After 20 minutes at room temperature, ½ ml. of ethanol is added and the mixture concentrated to a syrup in vacuo. Distribution of the residue between chloroform and water and subsequent extraction of the chloroform extract with dilute sodium bicarbonate solution and with water furnishes after drying over sodium sulfate and evaporation of the solvent in vacuo, about 30 mg. of crude 9α-chloro-Δ¹,⁴-pregnadiene-3,11,20-trione. Recrystallization from acetone-hexane furnishes the pure compound.

EXAMPLE 9

9α-Fluoro-Δ¹,⁴-Pregnadiene-3,11,20-Trione

A solution of 26 mg. of 9α-fluoro-Δ¹,⁴-pregnadiene-11β-ol-3,20-dione 21-acetate in 3 ml. of glacial acetic acid is oxidized with a solution of 8.3 mg. of chromium trioxide in 2 ml. of acetic acid. After 25 minutes the excess chromium trioxide is reduced with ethyl alcohol and the reaction mixture concentrated to small volume in vacuo. The residue is taken up in chloroform and extracted with water, dilute sodium bicarbonate solution and again with water. Drying of the chloroform solution with sodium sulfate and evaporation of the solvent in vacuo furnishes a crystalline residue which after recrystallization from acetone-hexane affords pure 9α-fluoro-Δ¹,⁴-pregnadiene-3,11,20-trione.

The invention may be variously otherwise embodied within the scope of the appended claims.

I claim:
1. A steroid of the general formula

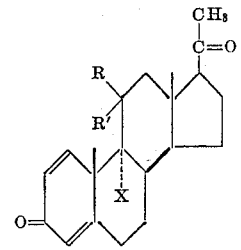

wherein individually R is hydrogen, R' is hydroxy and together R and R' is keto and X is α-halogen.
2. 9α-halo-11β-hydroxy-1,2-dehydroprogesterone.
3. 9α-bromo-11β-hydroxy-1,2-dehydroprogesterone.
4. 9α-chloro-11β-hydroxy-1,2-dehydroprogesterone.
5. 9α-fluoro-11β-hydroxy-1,2-dehydroprogesterone.
6. 9α-halo-11-keto-1,2-dehydroprogesterone.
7. 9α-bromo-11-keto-1,2-dehydroprogesterone.
8. 9β,11β-epoxy-Δ¹,⁴-pregnadiene-3,20-dione.
9. Δ¹,⁴,⁹⁽¹¹⁾-pregnatriene-3,20-dione.
10. 11α-sulfonyloxy-1,2-dehydroprogesterone.
11. 11α-mesyloxy-1,2-dehydroprogesterone.

References Cited in the file of this patent
UNITED STATES PATENTS

| | | |
|---|---|---|
| 2,409,798 | Reichstein | Oct. 22, 1946 |
| 2,666,070 | Murray et al. | Jan. 12, 1954 |
| 2,681,919 | Levin et al. | June 22, 1954 |
| 2,712,028 | Rosenkranz et al. | June 28, 1955 |
| 2,730,525 | Hogg et al. | Jan. 10, 1956 |
| 2,734,897 | Chemerda | Feb. 14, 1956 |
| 2,736,734 | Sarett | Feb. 28, 1956 |
| 2,773,080 | Bernstein | Dec. 4, 1956 |
| 2,854,383 | Herzog | Sept. 30, 1958 |